US011029839B2

(12) United States Patent
Hu et al.

(10) Patent No.: US 11,029,839 B2
(45) Date of Patent: Jun. 8, 2021

(54) APPLICATION DISPLAY METHOD AND TERMINAL

(71) Applicant: Huawei Device Co., Ltd, Dongguan (CN)

(72) Inventors: Zheng Hu, Beijing (CN); Bingtian Han, Shenzhen (CN); Xiangning Liu, Beijing (CN)

(73) Assignee: Huawei Device Co., Ltd., Dongguan (CN)

( * ) Notice: Subject to any disclaimer, the term of this patent is extended or adjusted under 35 U.S.C. 154(b) by 322 days.

(21) Appl. No.: 15/109,779

(22) PCT Filed: Jan. 6, 2014

(86) PCT No.: PCT/CN2014/070162
§ 371 (c)(1),
(2) Date: Jul. 5, 2016

(87) PCT Pub. No.: WO2015/100746
PCT Pub. Date: Jul. 9, 2015

(65) Prior Publication Data
US 2016/0328143 A1 Nov. 10, 2016

(51) Int. Cl.
*G06F 3/0482* (2013.01)
*G06F 3/0483* (2013.01)
*G06F 3/0488* (2013.01)

(52) U.S. Cl.
CPC ........ *G06F 3/04883* (2013.01); *G06F 3/0482* (2013.01); *G06F 3/04886* (2013.01)

(58) Field of Classification Search
CPC ................. G06F 2209/463; G06F 3/0482
See application file for complete search history.

(56) References Cited

U.S. PATENT DOCUMENTS

| | | | |
|---|---|---|---|
| 2008/0207188 A1 | 8/2008 | Ahn et al. | |
| 2009/0007001 A1* | 1/2009 | Morin | G06F 3/0237 715/773 |
| 2010/0123658 A1* | 5/2010 | Demuynck | G06F 3/0236 345/157 |
| 2013/0019193 A1 | 1/2013 | Rhee et al. | |

(Continued)

FOREIGN PATENT DOCUMENTS

| | | |
|---|---|---|
| CN | 103092494 A | 5/2013 |
| WO | WO 2012146900 A1 | 11/2012 |
| WO | 2013060178 A1 | 5/2013 |

*Primary Examiner* — Rayeez R Chowdhury
(74) *Attorney, Agent, or Firm* — Leydig, Voit & Mayer, Ltd.

(57) ABSTRACT

Embodiments of the present invention provide an application display method and a terminal, where the method includes: acquiring a first sliding gesture, where a start position of the first sliding gesture is located in a first preset operating area; and when the terminal detects that the first sliding gesture is a first preset sliding gesture, displaying an application that is in a first state, where the first state includes at least one of the following states: a state of running in the foreground, a state of running in the background, and a state of being buffered in the background. Therefore, a recently used application can be displayed to a user according to a gesture of the user, without a need to dispose a dedicated button, thereby improving operation and control efficiency.

20 Claims, 8 Drawing Sheets

(56) References Cited

U.S. PATENT DOCUMENTS

| | | | | |
|---|---|---|---|---|
| 2013/0055160 A1* | 2/2013 | Yamada | ................. | G06F 3/017 |
| | | | | 715/810 |
| 2013/0227419 A1* | 8/2013 | Lee | ........................ | G06F 9/48 |
| | | | | 715/728 |
| 2013/0275915 A1* | 10/2013 | Wang | ...................... | G06F 8/60 |
| | | | | 715/810 |
| 2014/0068518 A1* | 3/2014 | Liu | ..................... | G06F 3/0488 |
| | | | | 715/835 |

* cited by examiner

APPLICATION DISPLAY METHOD AND TERMINAL

CROSS-REFERENCE TO RELATED APPLICATION

This application is a National Stage of International Patent Application No. PCT/CN2014/070162, filed on Jan. 6, 2014, which is hereby incorporated by reference in its entirety.

TECHNICAL FIELD

Embodiments of the present invention relate to the field of communications technologies, and in particular, to an application display method and a terminal.

BACKGROUND

With the development of science and technology and rapid popularization of mobile terminals, applications developed for mobile terminals are increasing. A user can download and install various applications in a mobile phone as required, and can run multiple applications at the same time. Therefore, frequency of switching between multiple applications by the user also increases. In the prior art, a list of applications that are recently used by the user is displayed on a full-screen interface mainly by a short press on a dedicated physical button or by tapping a virtual key on a current display interface performed by the user. As shown in FIG. 1, the recently used applications include: an application running in the foreground, an application running in the background, and an application buffered in the background.

However, in the prior art, a dedicated button needs to be disposed for triggering display of applications that are recently used by a user.

SUMMARY

Embodiments of the present invention provide an application display method and a terminal, so as to display a recently used application to a user according to a gesture of the user, without a need to dispose a dedicated button, thereby improving operation and control efficiency.

According to a first aspect, an embodiment of the present invention provides an application display method, including:

acquiring a first sliding gesture, where a start position of the first sliding gesture is located in a first preset operating area; and when a terminal detects that the first sliding gesture is a first preset sliding gesture, displaying an application that is in a first state, where the first state includes at least one of the following states: a state of running in the foreground, a state of running in the background, and a state of being buffered in the background.

In a first possible implementation manner of the first aspect, the displaying an application that is in a first state includes:

displaying, in a preset area, a identifier of the application that is in the first state.

With reference to the first aspect or the first possible implementation manner of the first aspect, in a second possible implementation manner of the first aspect, after the displaying an application that is in a first state, the method further includes:

acquiring an instruction entered by a user; and displaying, on a current interface according to the instruction, an application interface of an application that is triggered by the instruction, where the application is any application of the application that is in the first state.

With reference to the first aspect or the first possible implementation manner of the first aspect, in a third possible implementation manner of the first aspect, after the displaying an application that is in a first state, the method further includes:

acquiring a second sliding gesture, where a start position of the second sliding gesture is located in the first preset operating area; and when the terminal detects that the second sliding gesture is a second preset sliding gesture, hiding the identifier of the application that is in the first state.

According to a second aspect, an embodiment of the present invention provides a terminal, including:

an acquiring unit, configured to acquire a first sliding gesture, where a start position of the first sliding gesture is located in a first preset operating area;

a processing unit, configured to detect whether the first sliding gesture acquired by the acquiring unit is a first preset sliding gesture; and a display unit, configured to: when the processing unit detects that the first sliding gesture acquired by the acquiring unit is the first preset sliding gesture, display an application that is in a first state, where the first state includes at least one of the following states: a state of running in the foreground, a state of running in the background, and a state of being buffered in the background.

In a first possible implementation manner of the second aspect, that the display unit displays an application that is in a first state is specifically:

the display unit displays, in a preset area, a identifier of the application that is in the first state.

With reference to the second aspect or the first possible implementation manner of the second aspect, in a second possible implementation manner of the second aspect, the acquiring unit is further configured to: after the display unit displays the application that is in the first state, acquire an instruction entered by a user; and the display unit is further configured to display, on a current interface according to the instruction acquired by the acquiring unit, an application interface of an application that is triggered by the instruction, where the application is any application of the application that is in the first state.

With reference to the second aspect or the first possible implementation manner of the second aspect, in a third possible implementation manner of the second aspect, the acquiring unit is further configured to acquire a second sliding gesture after the display unit displays the application that is in the first state, where a start position of the second sliding gesture is located in the first preset operating area;

the processing unit is further configured to detect whether the second sliding gesture acquired by the acquiring unit is a second preset sliding gesture; and the display unit is further configured to: when the processing unit detects that the second sliding gesture acquired by the acquiring unit is the second preset sliding gesture, hide the identifier of the application that is in the first state.

According to a third aspect, an embodiment of the present invention provides a terminal, where the terminal includes:

the input device, configured to acquire a first sliding gesture, where a start position of the first sliding gesture is located in a first preset operating area;

the processor, configured to detect whether the first sliding gesture acquired by the input device is a first preset sliding gesture; and the output device, configured to: when the processor detects that the first sliding gesture acquired by the input device is the first preset sliding gesture, display an application that is in a first state, where the first state includes at least one of the following states: a state of running in the foreground, a state of running in the background, and a state of being buffered in the background.

In a first possible implementation manner of the third aspect, that the output device displays an application that is in a first state is specifically:

the output device displays, in a preset area, a identifier of the application that is in the first state.

With reference to the third aspect or the first possible implementation manner of the third aspect, in a second possible implementation manner of the third aspect, the input device is further configured to: after the output device displays the application that is in the first state, acquire an instruction entered by a user; and the output device is further configured to display, on a current interface according to the instruction acquired by the input device, an application interface of an application that is triggered by the instruction, where the application is any application of the application that is in the first state.

With reference to the third aspect or the first possible implementation manner of the third aspect, in a third possible implementation manner of the third aspect, the input device is further configured to acquire a second sliding gesture after the output device displays the application that is in the first state, where a start position of the second sliding gesture is located in the first preset operating area;

the processor is further configured to detect whether the second sliding gesture acquired by the input device is a second preset sliding gesture; and the output device is further configured to: when the processor detects that the second sliding gesture acquired by the input device is the second preset sliding gesture, hide the identifier of the application that is in the first state.

In the application display method and the terminal provided in the embodiments of the present invention, a first sliding gesture is acquired, where a start position of the first sliding gesture is located in a first preset operating area, and when the terminal detects that the first sliding gesture is a first preset sliding gesture, an application that is in a first state is displayed. Therefore, a recently used application can be displayed to a user according to a gesture of the user, without a need to dispose a dedicated button, thereby improving operation and control efficiency.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be noted that a terminal involved in the embodiments of the present invention may be a touchscreen terminal, which includes but is not limited to a mobile phone, a tablet personal computer (PAD), a personal digital assistant (Personal Digital Assistant, PDA for short), a wireless handheld device, a wireless netbook, a portable computer, an MP3 player, an MP4 player, and the like.

Figure 2:
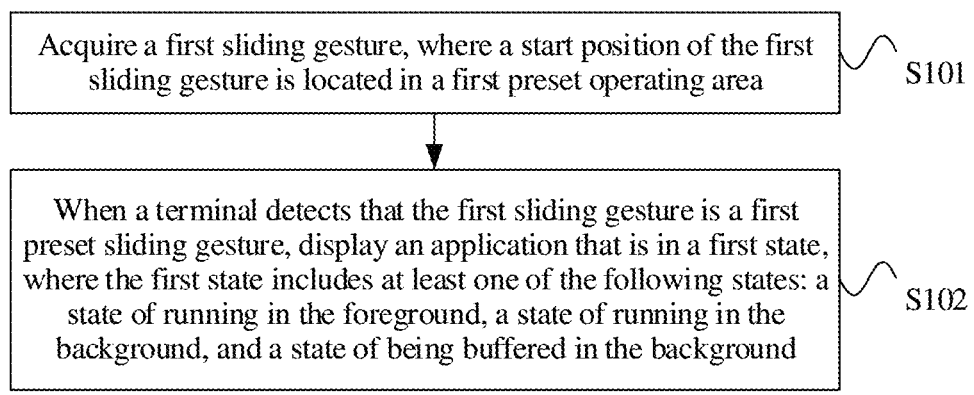
FIG. 2 is a flowchart of an application display method according to an embodiment of the present invention.

FIG. 2 is a flowchart of an application display method according to an embodiment of the present invention. As shown in FIG. 2, the method in this embodiment may include the following steps:

S101. Acquire a first sliding gesture, where a start position of the first sliding gesture is located in a first preset operating area.

In this embodiment, a user of a terminal may start the first sliding gesture from a first preset operating area on a touchscreen, where the touchscreen is a touchscreen of the terminal and the terminal may acquire the first sliding gesture of the user. Specifically, the user may start an operation of a first gesture from the first preset operating area on the touchscreen. When determining that the first gesture performed by the user on the touchscreen is a sliding gesture, the terminal may acquire coordinates of a start position of the sliding gesture. When determining that the coordinates of the start position are located in the first preset operating area of the touchscreen, the terminal may use the sliding gesture as the first sliding gesture and perform S102.

Optionally, the first preset operating area may be a bottom display area on the touchscreen of the terminal, a top area on the touchscreen of the terminal, a left-side area on the touchscreen of the terminal, a right-side area on the touchscreen of the terminal, or a virtual navigation bar area on the touchscreen of the terminal.

Optionally, the first preset operating area may be rectangular, or the first preset operating area may be circular.

S102. When a terminal detects that the first sliding gesture is a first preset sliding gesture, display an application that is in a first state, where the first state includes at least one of the following states: a state of running in the foreground, a state of running in the background, and a state of being buffered in the background.

Specifically, after acquiring the first sliding gesture, the terminal determines an operation track corresponding to the first sliding gesture, where the operation track is a track formed by acting points of an operation, corresponding to information about the first sliding gesture, on the output device. A start position of the operation track is located in the first preset operating area of the terminal. Optionally, that a terminal detects that the first sliding gesture is a first preset sliding gesture is specifically as follows: When a distance of the operation track, corresponding to the first sliding gesture, in the first preset operating area is greater than or equal to a preset threshold, the terminal determines that the first sliding gesture is the first preset sliding gesture. Optionally, that a terminal detects that the first sliding gesture is a first preset sliding gesture is specifically as follows: The terminal determines that the first sliding gesture is the first preset sliding gesture when an angle between a landscape orientation of the output device of the terminal and a line formed by a start point of an operation track and an end point of the operation track is less than or equal to a first threshold, where the operation track is formed in the first preset operating area by the first preset sliding gesture; or when an angle between a portrait orientation of the output device of the terminal and a line formed by a start point of an operation track and an end point of the operation track is less than or equal to a first threshold, where the operation track is formed in the first preset operating area by the first preset sliding gesture. The distance threshold and the angle threshold may be specific values, or may be value ranges. The terminal may also determine, according to the distance and the angle of the operation track, that the first sliding gesture is the first preset sliding gesture.

In this embodiment, when determining that a first sliding gesture is a first preset sliding gesture, a terminal may learn that a user of the terminal requests to acquire an application that is in a first state, where the first state includes at least one of the following states: a state of running in the foreground, a state of running in the background, and a state of being buffered in the background. Then, the application that is in the first state may include at least one of the following applications: an application running in the foreground, an application running in the background, and an application buffered in the background. The application that is in the state of running in the foreground is an application that is running on a current interface. The application that is in the state of running in the background is an application that is not running on the current interface but is not closed. The application that is in the state of being buffered in the background is an application that is not running on the current interface and is closed, but data required for running the application is still buffered in a memory of a terminal device. The application that is in the first state is an application that is recently used by the user of the terminal. Then, the terminal may acquire the application that is in the first state (including a identifier of the application) and display, on the touchscreen, the application that is in the first state. For example, the terminal may display, on the entire touchscreen, the application that is in the first state, or display, in a preset area of the touchscreen, the application that is in the first state. A feasible implementation manner of displaying the application that is in the first state may be generating a list for the terminal, where the list includes the application that is in the first state (for example, the identifier of the application), which is not limited in this embodiment of the present invention. In this case, the user may perform application switching according to the application that is in the first state. In this embodiment of the present invention, the recently used application is displayed to the user according to the sliding gesture of the user, without a need to dispose a dedicated button.

Optionally, that the terminal displays an application that is in a first state may include: The terminal displays, according to preset order, the application that is in the first state, where the preset order may be a descending order of frequency of using an application by the user within a preset time, an ascending order of a difference between a time at which the user uses an application and a current time, or the like.

In this embodiment, a terminal acquires a first sliding gesture, where a start position of the first sliding gesture is located in a first preset operating area of the terminal, and when it is detected that the first sliding gesture is a first preset sliding gesture, the terminal displays an application that is in a first state. Therefore, a recently used application can be displayed to a user according to a gesture of the user, without a need to dispose a dedicated button, thereby improving operation and control efficiency.

Further, that the terminal displays an application that is in a first state includes: The terminal displays, in the preset area, the identifier of the application that is in the first state, where the preset area may be an area that is the same as the first preset operating area. In this embodiment, the terminal may add a window in the preset area so as to display the identifier of the application that is in the first state. For example, a list is generated in the preset area, where the list includes an icon or a name of the application that is in the first state. In this embodiment, the terminal may display, in the preset area in the current application interface of the touchscreen, the application that is in the first state, and it is not required to switch an interface when displaying the application that is in the first state. Therefore, the user may switch an application quickly and intuitively in a case in which no area of an application interface is blocked, thereby enhancing user experience.

Optionally, the preset area may be: a bottom display area on the touchscreen of the terminal, a top display area on the touchscreen of the terminal, a left-side display area on the touchscreen of the terminal, a right-side display area on the touchscreen of the terminal, or a virtual navigation bar area on the touchscreen of the terminal.

Optionally, the first preset sliding gesture is a leftward sliding gesture, a rightward sliding gesture, an upward sliding gesture, or a downward sliding gesture.

Figure 3:
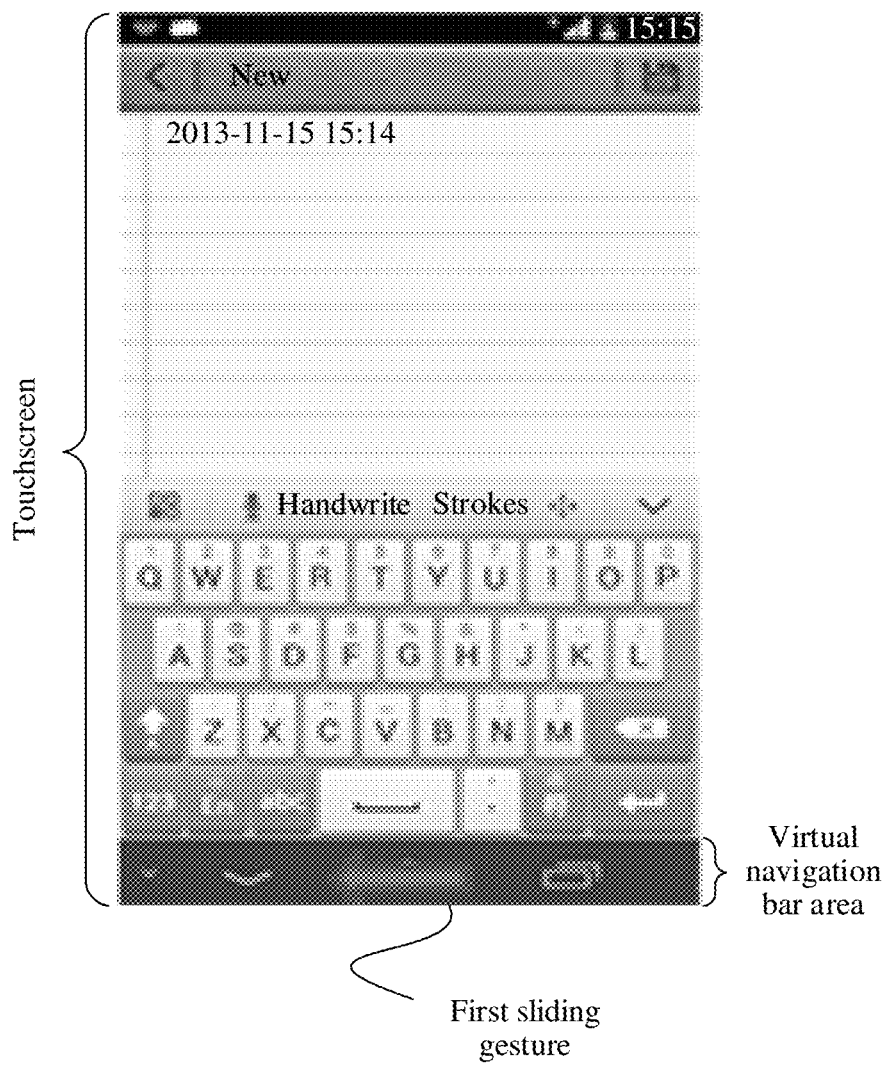
FIG. 3 is a schematic diagram of a virtual navigation bar area and a first sliding gesture according to an embodiment of the present invention.
Figure 4:
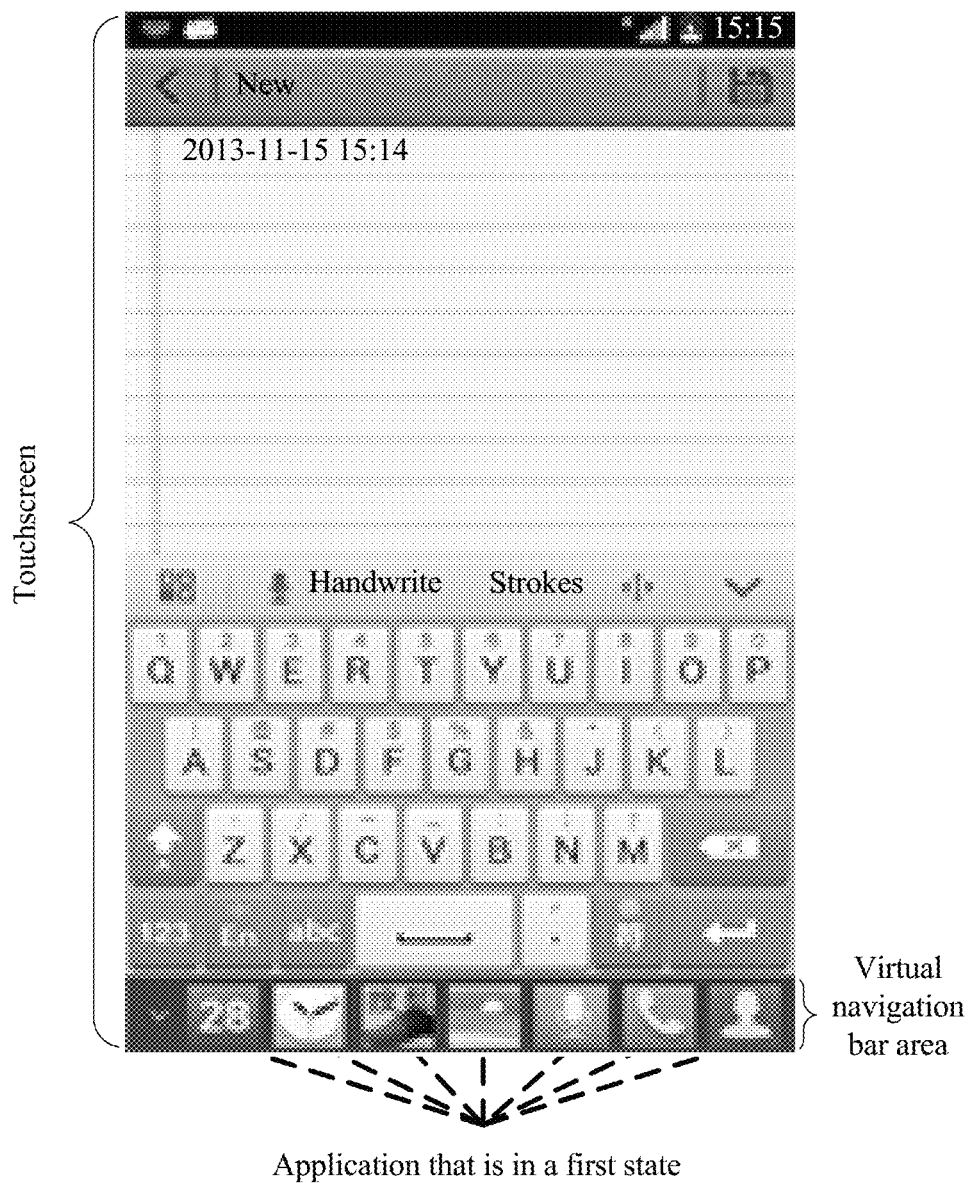
FIG. 4 is a schematic diagram of a virtual navigation bar area and an application that is in a first state according to an embodiment of the present invention.

In a feasible implementation manner, for a terminal having a virtual navigation bar, the user may perform a leftward sliding gesture on the virtual navigation bar on the touchscreen of the terminal, as shown in FIG. 3. The virtual navigation bar shown in FIG. 3 is located in the bottom display area of the touchscreen. When the terminal detects that the user performs a leftward sliding gesture on the virtual navigation bar, the terminal may display, in the virtual navigation bar by adding a window, the identifier of the application that is in the first state, as shown in FIG. 4.

Figure 5:
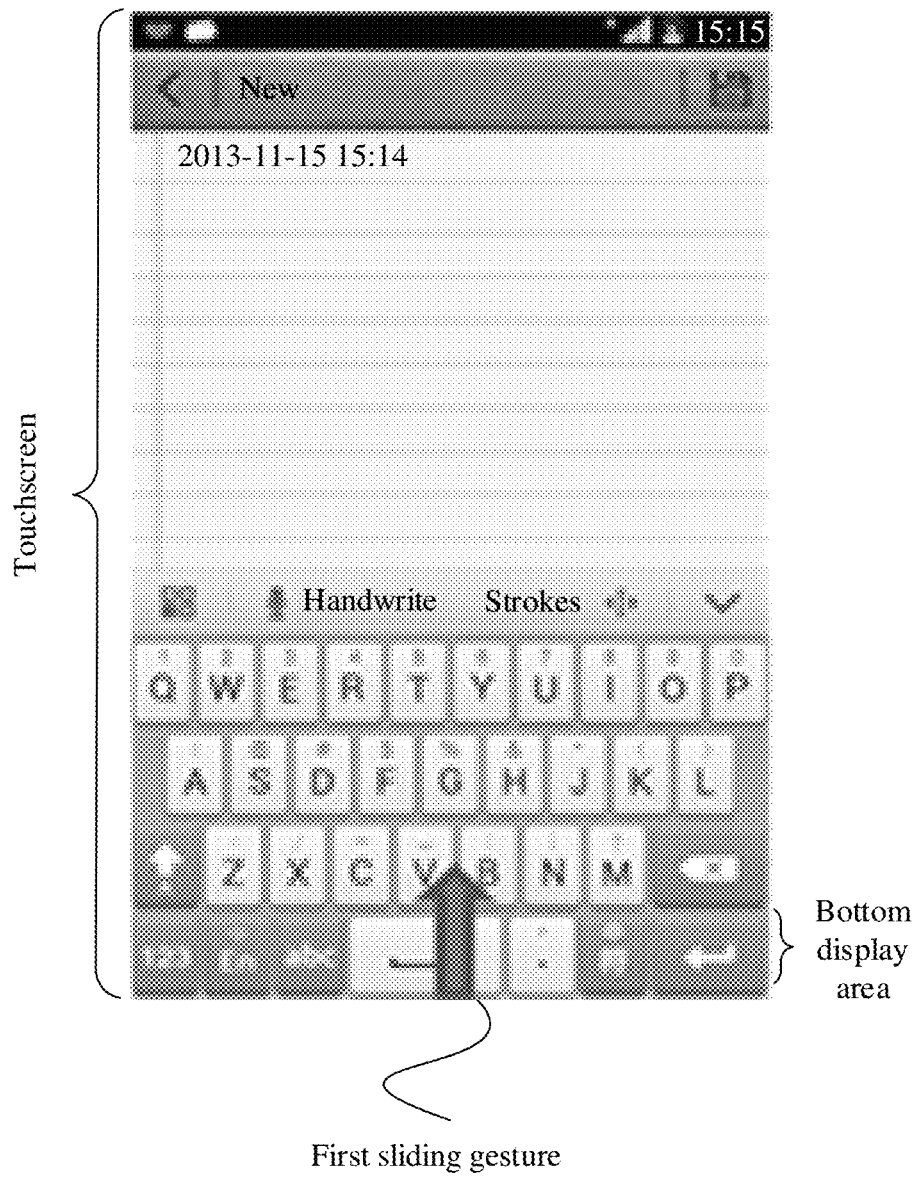
FIG. 5 is a schematic diagram of a bottom display area and a first sliding gesture according to an embodiment of the present invention.
Figure 6:
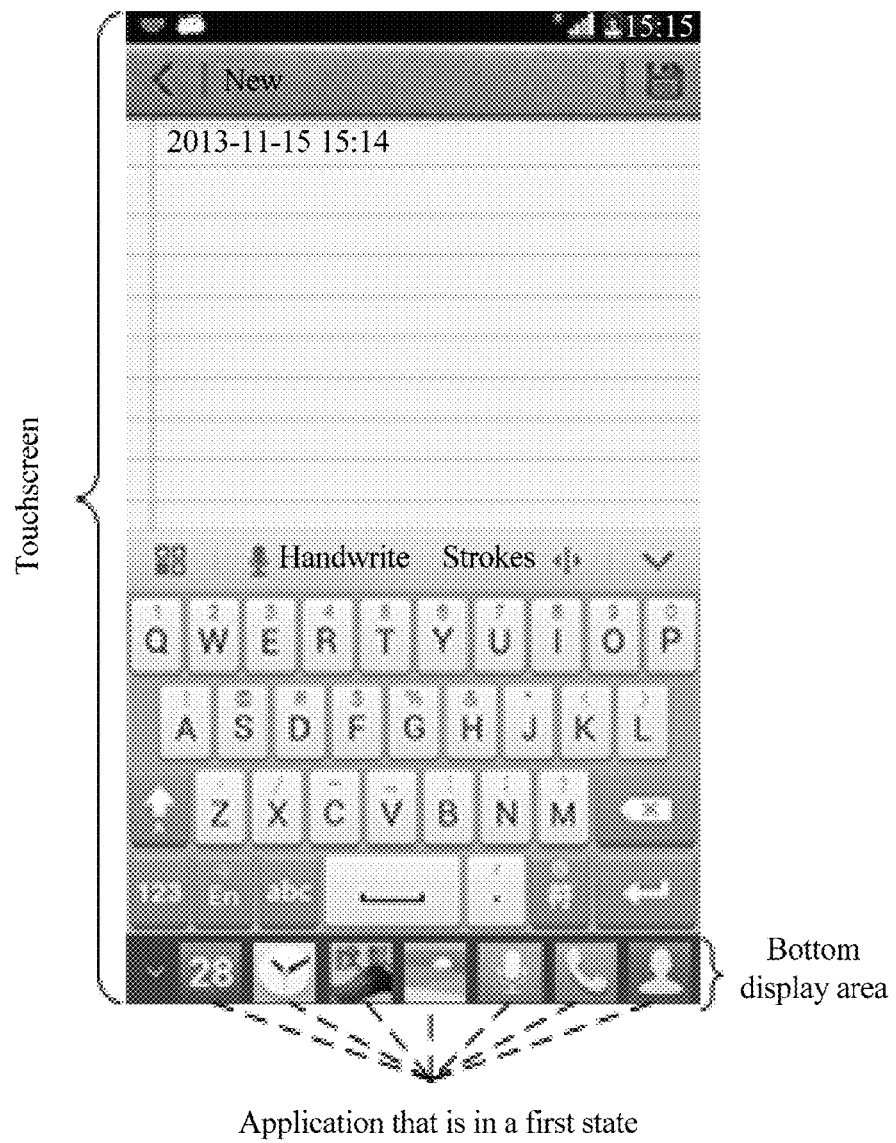
FIG. 6 is a schematic diagram of a bottom display area and an application that is in a first state according to an embodiment of the present invention.

In a second feasible implementation manner, for a terminal having a physical button, the user may perform an upward sliding gesture in the bottom display area on the touchscreen of the terminal, as shown in FIG. 5. The first preset operating area shown in FIG. 3 is located in the bottom display area of the touchscreen. When the terminal detects that the user performs an upward sliding gesture on the bottom display area, the terminal may display, in the bottom display area by adding a window, the identifier of the application that is in the first state, as shown in FIG. 6. In this implementation manner, the terminal displays, only in the bottom display area, the application recently used by the user, so as to switch an application quickly in a case in which no area of a user application interface is blocked. It should be noted that, this embodiment of the present invention is not limited to the foregoing two feasible implementation manners.

Figure 1:
FIG. 1 is a schematic diagram of a list of applications that are recently used by a user in the prior art.

In the application display method provided in this embodiment of the present invention, after the application that is in the first state is displayed, further, based on the method embodiment shown in FIG. 1, the method in this embodiment further includes: acquiring an instruction entered by a user; and displaying, on a current interface according to the instruction, an application interface of an application that is triggered by the instruction, where the application is any application of the application that is in the first state. Specifically, the user may enter the instruction. For example, the user may tap any application (for example, a identifier of the application) of the application that is in the first state and displayed on the touchscreen of the terminal, that is, the user enters a user instruction, where the instruction is used to trigger the application tapped by the user. Therefore, the terminal may acquire the instruction entered by the user and learn that the user requires the terminal to display the application triggered by the instruction; for example, the user needs to switch to the application triggered by the instruction. Further, the terminal may display, on the current interface, the application triggered by the instruction, thereby implementing quick switching between applications.

Figure 7:
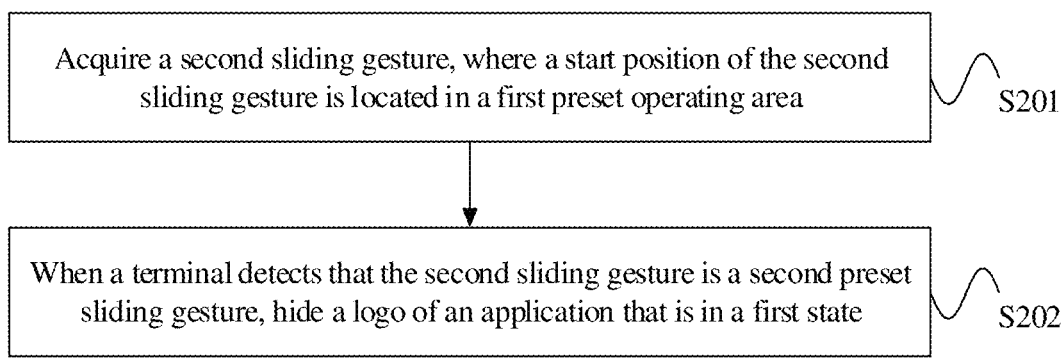
FIG. 7 is a flowchart of an application display method according to an embodiment of the present invention.

FIG. 7 is a flowchart of an application display method according to an embodiment of the present invention. As shown in FIG. 7, based on the method embodiment shown in FIG. 1, further, the method in this embodiment may further include the following steps:

S201. Acquire a second sliding gesture, where a start position of the second sliding gesture is located in the first preset operating area.

In this embodiment, after the terminal displays the application that is in the first state, the user of the terminal may start the second sliding gesture from the first preset operating area on the touchscreen. Then, the terminal may acquire the second sliding gesture of the user. Specifically, when determining that a gesture performed by the user on the touchscreen is a sliding gesture, an endpoint terminal may acquire coordinates of a start position of the sliding gesture. When determining that the coordinates of the start position are located in the first preset operating area of the touchscreen, the terminal may use the sliding gesture as the second sliding gesture and perform S202.

S202. When the terminal detects that the second sliding gesture is a second preset sliding gesture, hide the identifier of the application that is in the first state.

Optionally, the second preset sliding gesture may be a sliding gesture that is the same as the foregoing first preset sliding gesture. When the terminal detects that the second sliding gesture is the second preset sliding gesture, if the terminal displays only a part of applications that are in the first state but does not display another part of applications, the terminal continues to display the another part of applications that are in the first state; if the terminal already displays all applications that are in the first state to the user, the terminal may hide displayed identifiers of the applications that are in the first state. For example, a window for displaying an application that is in a first state may be closed. If the current interface is an application interface of a running application, the identifier that is previously displayed and is of the application that is in the first state may be hidden, but the application interface of the running application displayed on the current interface may still be retained.

Optionally, the second preset sliding gesture may be a sliding gesture inverse to the foregoing first preset sliding gesture. For example, if the first preset sliding gesture is a leftward sliding gesture, the second preset sliding gesture is a rightward sliding gesture; if the first preset sliding gesture is a rightward sliding gesture, the second preset sliding gesture is a leftward sliding gesture; if the first preset sliding gesture is an upward sliding gesture, the second preset sliding gesture is a downward sliding gesture; if the first preset sliding gesture is a downward sliding gesture, the second preset sliding gesture is an upward sliding gesture. When the terminal detects that the second sliding gesture is the second preset sliding gesture, it indicates that the user no longer requests to acquire the application that is in the first state. Then, the terminal may hide the displayed identifier of the application that is in the first state. For example, a window for displaying the application that is in the first state may be closed.

In this embodiment, further, a terminal acquires a second sliding gesture, where a start position of the second sliding gesture is located in a first preset operating area of the terminal, and when it is detected that the second sliding gesture is a second preset sliding gesture, hides a identifier of an application that is in a first state. Therefore, the identifier that is displayed on the terminal and is of the application that is in the first state may be hidden according to a gesture of a user.

Figure 8:
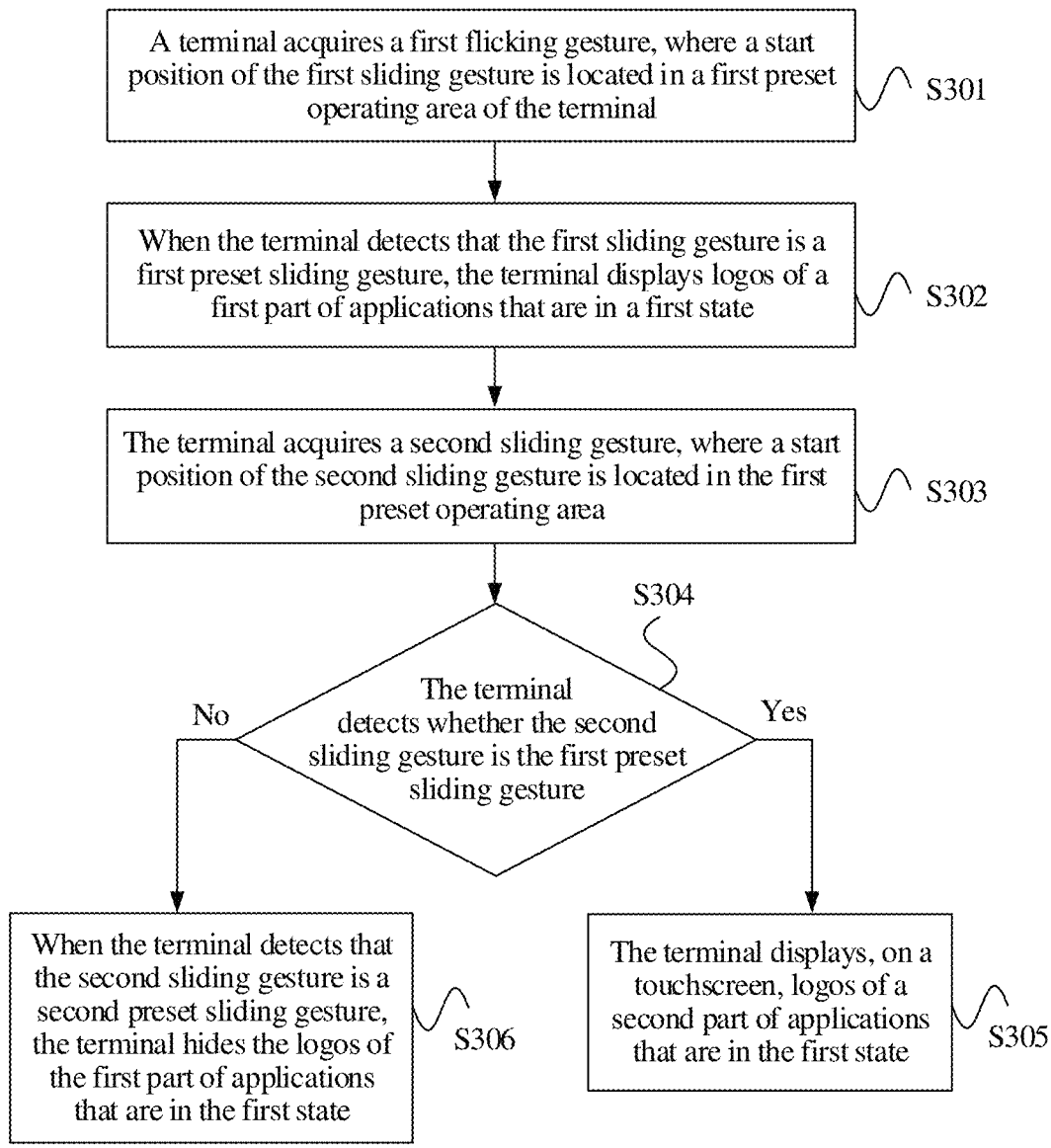
FIG. 8 is a flowchart of an application display method according to an embodiment of the present invention.

FIG. 8 is a flowchart of an application display method according to an embodiment of the present invention. As shown in FIG. 8, further, the method in this embodiment may include the following steps:

S301. A terminal acquires a first sliding gesture, where a start position of the first sliding gesture is located in a first preset operating area of the terminal.

A specific implementation process of S301 in this embodiment is similar to the specific implementation process of S101 in method embodiment 1 of the present invention. For details, refer to related description of the foregoing method embodiment of the present invention, and details are not described herein again.

S302. When the terminal detects that the first sliding gesture is a first preset sliding gesture, the terminal displays identifiers of a first part of applications that are in a first state.

In this embodiment, if there are a relatively large quantity of applications that are in the first state, when a display area of a touchscreen of the terminal cannot display, in a display interface, all applications that are in the first state, a part of applications that are in the first state may be displayed. For example, a first part of applications that are in the first state may be displayed. The remaining applications that are in the first state may be displayed when a user performs a next first preset sliding gesture. In this embodiment, after S302 is performed, S303 may further be performed.

Optionally, the terminal displays, in a preset area of the touchscreen, the identifiers of the first part of applications that are in the first state.

S303. The terminal acquires a second sliding gesture, where a start position of the second sliding gesture is located in the first preset operating area.

A specific implementation process of S303 in this embodiment is similar to the specific implementation process of S201 in method embodiment 2 of the present invention. For details, refer to related description of the foregoing method embodiment of the present invention, and details are not described herein again.

S304. The terminal detects whether the second sliding gesture is the first preset sliding gesture. If yes, perform the step S305; if not, perform the step S306.

In this embodiment, the terminal detects whether the second sliding gesture is the first preset sliding gesture; if it is detected that the second sliding gesture is the first preset sliding gesture, performs S305, or if it is detected that the second sliding gesture is not the first preset sliding gesture, performs S306.

S305. The terminal displays, on a touchscreen, identifiers of a second part of applications that are in the first state.

In this embodiment, when it is detected that the second sliding gesture is the first preset sliding gesture, the terminal may learn that the user of the terminal still requests to acquire the application that is in the first state. Because the identifiers of the first part of applications that are in the first state are already displayed previously, identifiers of the remaining applications that are in the first state may be displayed on the touchscreen at this time. For example, identifiers of a second part of applications that are in the first state may be displayed on the touchscreen.

Optionally, the terminal displays, in the preset area of the touchscreen, the identifiers of the second part of applications that are in the first state.

S306. When the terminal detects that the second sliding gesture is a second preset sliding gesture, the terminal hides the identifiers of the first part of applications that are in the first state.

In this embodiment, after the terminal detects that the second sliding gesture is not the first preset sliding gesture, when the terminal detects that the second sliding gesture is the second preset sliding gesture, it indicates that the user no longer requests to acquire the application that is in the first state. Then, the identifiers that are displayed on the touchscreen and are of the first part of applications that are in the first state may be hidden. For example, a window for displaying the application that is in the first state may be closed.

In this embodiment, a recently used application can be displayed to a user according to a gesture of the user, without a need to dispose a dedicated button. Further, the application that is recently used by the user may further be displayed in a preset area (for example, a bottom area) of a touchscreen, so as to switch an application quickly in a case in which no area of a user application interface is blocked, thereby enhancing user experience.

Optionally, in the foregoing embodiments of the present invention, an entire operation track of the first preset sliding gesture is located in the first preset operating area. Optionally, an entire operation track of the second preset sliding gesture is located in the first preset operating area.

Figure 9:
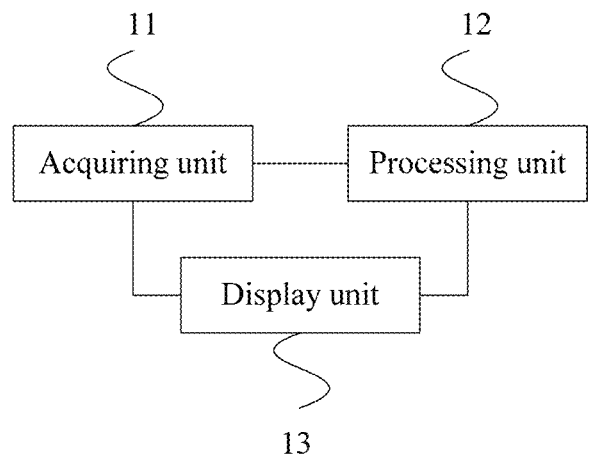
FIG. 9 is a schematic structural diagram of a terminal according to an embodiment of the present invention.

FIG. 9 is a schematic structural diagram of a terminal according to an embodiment of the present invention. As shown in FIG. 9, the terminal in this embodiment may include: an acquiring unit 11, a processing unit 12, and a display unit 13. The acquiring unit 11 is configured to acquire a first sliding gesture, where a start position of the first sliding gesture is located in a first preset operating area. The processing unit 12 is configured to detect whether the first sliding gesture acquired by the acquiring unit 11 is a first preset sliding gesture. The display unit 13 is configured to: when the processing unit 12 detects that the first sliding gesture acquired by the acquiring unit 11 is the first preset sliding gesture, display an application that is in a first state, where the first state includes at least one of the following states: a state of running in the foreground, a state of running in the background, and a state of being buffered in the background.

Optionally, the first preset operating area is a bottom display area on a touchscreen of the terminal, a top display area on a touchscreen of the terminal, a left-side display area on a touchscreen of the terminal, a right-side display area on a touchscreen of the terminal, or a virtual navigation bar area on a touchscreen of the terminal.

Optionally, that the display unit 13 displays an application that is in a first state is specifically: the display unit 13 displays, in a preset area, a identifier of the application that is in the first state.

Optionally, the preset area is the bottom display area on the touchscreen of the terminal, the top display area on the touchscreen of the terminal, the left-side display area on the touchscreen of the terminal, the right-side display area on the touchscreen of the terminal, or the virtual navigation bar area on the touchscreen of the terminal.

Optionally, the first preset sliding gesture is a leftward sliding gesture, a rightward sliding gesture, an upward sliding gesture, or a downward sliding gesture.

Optionally, the acquiring unit 11 is further configured to: after the display unit 13 displays the application that is in the first state, acquire an instruction entered by a user. The display unit 13 is further configured to display, on a current interface according to the instruction acquired by the acquiring unit 11, an application interface of an application that is triggered by the instruction, where the application is any application of the application that is in the first state.

Optionally, the acquiring unit 11 is further configured to acquire a second sliding gesture after the display unit 13 displays the application that is in the first state, where a start position of the second sliding gesture is located in the first preset operating area. The processing unit 12 is further configured to detect whether the second sliding gesture acquired by the acquiring unit 11 is a second preset sliding gesture. The display unit 13 is further configured to: when the processing unit 12 detects that the second sliding gesture acquired by the acquiring unit 11 is the second preset sliding gesture, hide the identifier of the application that is in the first state.

The terminal in this embodiment may be configured to execute the technical solutions of the application display method provided in the foregoing embodiments of the present invention, and an implementation principle and a technical effect thereof are similar. For details, refer to related description of the foregoing method embodiments of the present invention, and details are not described herein again.

Figure 10:
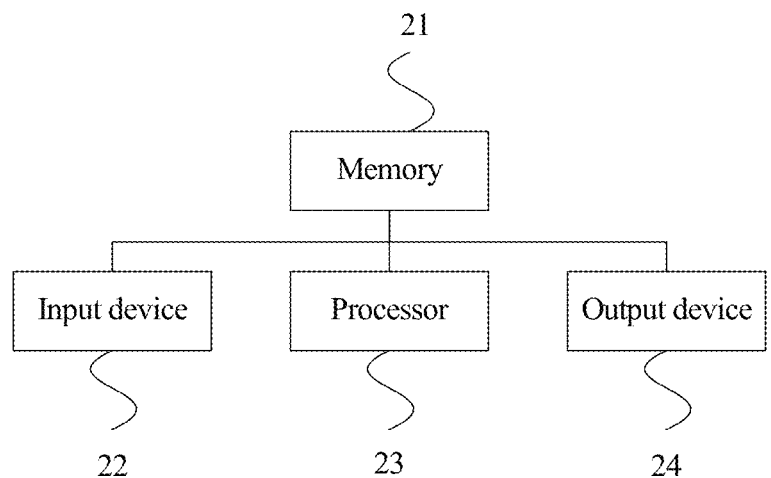
FIG. 10 is a schematic structural diagram of a terminal according to an embodiment of the present invention.

FIG. 10 is a schematic structural diagram of a terminal according to an embodiment of the present invention. In this embodiment of the present invention, the terminal may be a computer system in a handheld form, such as a smartphone, a tablet personal computer (Tablet Personal Computer), a personal digital assistant (personal digital assistant, PDA for short), a mobile Internet device (Mobile Internet Device, MID for short), a wearable device (Wearable Device), or the like. Persons killed in the art may understand that the structure of the terminal device shown in FIG. 10 does not constitute a limitation on the terminal device, where the terminal device may include parts more or less than those shown in the figure, or a combination of some parts, or different part arrangements. The following describes integral parts of the terminal device in detail with reference to FIG. 10.

An input device 22 is configured to implement interaction between a user and an electronic device and/or input of information into the electronic device. For example, the input device 22 may receive digit or character information that is entered by the user, so as to generate a signal input related to user settings or function control. In a specific implementation manner of the present invention, the input device 22 may be a touch panel, or may be another human-machine interaction interface, such as a physical input button or a microphone; or may be another apparatus for acquiring external information, such as a camera. The touch panel, also referred to as a touchscreen or a touchscreen, may collect an operation action of touching the touch panel or approaching the touch panel, for example, an operation action performed by the user on the touch panel or at a position close to the touch panel by using any proper object or accessory such as a finger or a stylus, and a corresponding connecting apparatus is driven according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller; the touch controller receives the electrical signal from the touch detection apparatus, converts the electrical signal into touch point coordinates, and then transmits the touch point coordinates to a processor 23. The touch controller may further receive and execute a command sent from the processor 23. In addition, the touch panel may be implemented by using multiple types, such as a resistive type, a capacitive type, an infrared (Infrared) ray, and a surface acoustic wave. In another implementation manner of the present invention, the physical input button used by the input device 24 may include but is not limited to one or more of a physical keyboard, a functional button (such as a volume control button or a power button), a trackball, a mouse, an operating lever, or the like. An input device in a form of a microphone may collect voice that is input by the user or an environment, and convert the voice into a command that is in a form of an electric signal and can be executed by the processor 23. In some implementation manners of the present invention, the input device 22 may also be various sensing components, for example, a Hall component, configured to detect a physical quantity of the electronic device, for example, force, torque, pressure, stress, a position, a displacement, a speed, acceleration, an angle, an angular velocity, a number of revolutions, a rotational speed, and a time at which a working state changes, which are converted into electricity for detection and control. Other sensing components may further include a gravity sensor, a tri-axis accelerometer, a gyroscope, and the like.

An output device 24 includes but is not limited to an image output device and a sound output device. The image output device is configured to output a character, a picture, and/or a video. The image output device may include a display panel, for example, a display panel configured in a form of a liquid crystal display (Liquid Crystal Display, LCD for short), an organic light-emitting diode (Organic Light-Emitting Diode, OLED for short), a field emission display (field emission display, FED for short), and the like; or the image output device may include a reflective display, for example, an electrophoretic (electrophoretic) display or a display using an interferometric modulation of light (Interferometric Modulation of Light) technology. The image output device may include a single display or multiple displays in different sizes. In a specific implementation manner of the present invention, the touch panel used by the input device 22 may also be used as a display panel of the output device. For example, after detecting a gesture of touching the touch panel or approaching the touch panel, the touch panel transmits the gesture to the processor 23 to determine a type of a touch event, and then the processor 23 provides a corresponding visual output on the display panel according to the type of the touch event. The input device 22 and the output device 24 are used as two independent parts to implement input and output functions of the electronic device, but the touch panel and the display panel may be integrated to implement the input and output functions of the electronic device. For example, the image output device may display various graphical user interfaces (Graphical User Interface, GUI for short), so as to use the graphical user interfaces as virtual control components, and the graphical user interfaces include but are not limited to a window, a scrollbar, an icon, and a scrapbook, so that the user operates in a touch manner.

The processor 23 is a control center of the terminal device. Various interfaces and lines are used to connect to various parts of the entire computer. The processor 23 executes various functions of a station and processes data by running or executing a software program and/or an application unit stored in a memory and invoking data stored in the memory 21, so as to perform overall monitoring on the station.

As shown in FIG. 10, the terminal may include: the memory 21, the input device 22, the processor 23, and the output device 24, where the memory 21 is configured to store program code for executing an application display method and the memory 21 may include a non-volatile memory (Non-volatile Memory).

The input device 22 may be a touchscreen and the output device 24 may also be a touchscreen. The processor 23 may be a central processing unit (Central Processing Unit, CPU for short), or an application specific integrated circuit (Application Specific Integrated Circuit, ASIC for short), or be configured as one or more integrated circuits for implementing this embodiment of the present invention. The input device 22, the processor 23, and the output device 24 are configured to invoke the program code stored in the memory 21, so as to execute the following operations.

The input device 22 is configured to acquire a first sliding gesture, where a start position of the first sliding gesture is located in a first preset operating area.

The processor 23 is configured to detect whether the first sliding gesture acquired by the input device 22 is a first preset sliding gesture.

The output device 24 is configured to: when the processor 23 detects that the first sliding gesture acquired by the input device 22 is the first preset sliding gesture, display an application that is in a first state, where the first state includes at least one of the following states: a state of running in the foreground, a state of running in the background, and a state of being buffered in the background.

Optionally, the first preset operating area is a bottom display area on a touchscreen of the terminal, a top display area on a touchscreen of the terminal, a left-side display area on a touchscreen of the terminal, a right-side display area on a touchscreen of the terminal, or a virtual navigation bar area on a touchscreen of the terminal.

Optionally, that the output device 24 displays an application that is in a first state is specifically: the output device 24 displays, in a preset area, a identifier of the application that is in the first state.

Optionally, the preset area is the bottom display area on the touchscreen of the terminal, the top display area on the touchscreen of the terminal, the left-side display area on the touchscreen of the terminal, the right-side display area on the touchscreen of the terminal, or the virtual navigation bar area on the touchscreen of the terminal.

Optionally, the first preset sliding gesture is a leftward sliding gesture, a rightward sliding gesture, an upward sliding gesture, or a downward sliding gesture.

Optionally, the input device 22 is further configured to: after the output device 24 displays the application that is in the first state, acquire an instruction entered by a user. The output device 24 is further configured to display, on a current interface according to the instruction acquired by the input device 22, an application interface of an application that is triggered by the instruction, where the application is any application of the application that is in the first state.

Optionally, the input device 22 is further configured to acquire a second sliding gesture after the output device 24 displays the application that is in the first state, where a start position of the second sliding gesture is located in the first preset operating area.

The processor 23 is further configured to detect whether the second sliding gesture acquired by the input device 22 is a second preset sliding gesture.

The output device 24 is further configured to: when the processor 23 detects that the second sliding gesture acquired by the input device 22 is the second preset sliding gesture, hide the identifier of the application that is in the first state.

It should be noted that, for the technical solutions specifically implemented by the input device 22, the processor 23, and the output device 24 by invoking the program code stored in the memory 21, refer to the foregoing application display method provided in the embodiments of the present invention, and an implementation principle and a technical effect thereof are similar. For details, refer to related description of the foregoing embodiments, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A mobile terminal, comprising:
   a touchscreen;
   one or more processors; and
   memory, configured to store one or more programs and a first software application, wherein the one or more programs are configured to be executed by the one or more processors, and the one or more programs comprise instructions for:
   displaying the first software application in full on the touchscreen;
   detecting a first sliding gesture;
   determining whether the first sliding gesture is a first preset sliding up gesture starting from a position in a preset operating area of the touchscreen;
   when the first sliding gesture is the first preset sliding up gesture, in response to the first sliding gesture, displaying a list of one or more identifiers of software applications recently active on the mobile terminal;
   when the list of the one or more identifiers is displayed on the touchscreen, in a case that a tap gesture is detected on an identifier of a second software application in the list, in response to the tap gesture, displaying the second software application in full on the touchscreen;
   when the list of the one or more identifiers is displayed on the touchscreen, in a case that a second sliding gesture is detected, determining whether the second sliding gesture is a second preset sliding gesture starting from a position in the preset operating area of the touchscreen, wherein the second preset sliding gesture is different from the first preset sliding gesture; and
   when the second sliding gesture is the second preset sliding gesture, in response to the second sliding gesture, ceasing to display the list on the touchscreen;
   wherein the preset operating area is a bottom area of the touchscreen.

2. The mobile terminal according to claim 1, wherein the one or more identifiers of software applications are displayed in the list in an ascending order of a difference between a time at which an application is active on the mobile terminal and a current time.

3. The mobile terminal according to claim 1, wherein the list of the one or more identifiers are displayed in a predefined area of the touchscreen.

4. The mobile terminal according to claim 1, wherein the one or more programs further comprise instructions for:
   when the list of one or more identifiers is displayed on the touchscreen, in a case that a gesture of sliding left is detected, in response to the gesture of sliding left, displaying an identifier of a third software application (TSA) in the list and ceasing to display an identifier of a fourth software application (FSA) which was previously displayed in the list.

5. The mobile terminal according to claim 1, wherein the one or more programs further comprise instructions for:
   when the list of one or more identifiers is displayed on the touchscreen, in a case that a gesture of sliding right is detected, in response to the gesture of sliding right, displaying an identifier of a fifth software application (FISA) in the list and ceasing to display an identifier of a sixth software application (SSA) which was previously displayed in the list.

6. The mobile terminal according to claim 1, wherein the one or more identifiers of software applications include one or more icons of software applications, and each icon is a same icon when each software application is represented as its corresponding icon on a home screen of the mobile terminal.

7. The mobile terminal according to claim 4, wherein the TSA is displayed in a separate window with an icon of the TSA displayed in the separate window.

8. The mobile terminal according to claim 5, wherein the FISA is displayed in a separate window with an icon of the FISA displayed in the separate window.

9. The mobile terminal according to claim 1, wherein the one or more programs further comprise instructions for:
when the list of software applications is displayed on the touchscreen, in a case that a gesture of closing a software application is detected, in response to the gesture of closing the software application, ceasing to display a seventh software application (SESA) in the list of software applications.

10. A non-transitory computer-readable storage medium comprising instructions that, when executed by a mobile terminal, cause the mobile terminal to carry out steps comprising:
displaying a first software application in full on a touchscreen of the mobile terminal;
detecting a first sliding gesture;
determining whether the first sliding gesture is a first preset sliding up gesture starting from a position in a preset operating area of the touchscreen;
when the first sliding gesture is the first preset sliding up gesture, in response to the first sliding gesture, displaying a list of one or more identifiers of software applications recently active on the mobile terminal;
when the list of the one or more identifiers is displayed on the touchscreen, in a case that a tap gesture is detected on an identifier of a second software application in the list, in response to the tap gesture, displaying the second software application in full on the touchscreen;
when the list of the one or more identifiers is displayed on the touchscreen, in a case that a second sliding gesture is detected, determining whether the second sliding gesture is a second preset sliding gesture starting from a position in the preset operating area of the touchscreen, wherein the second preset sliding gesture is different from the first preset sliding gesture; and
when the second sliding gesture is the second preset sliding gesture, in response to the second sliding gesture, ceasing to display the list on the touchscreen;
wherein the preset operating area is a bottom area of the touchscreen.

11. The non-transitory computer-readable storage medium according to claim 10, wherein the list of the one or more identifiers are displayed in a pre-defined area of the touchscreen.

12. The non-transitory computer-readable storage medium according to claim 10, further comprising instructions that, when executed by the mobile terminal, cause the mobile terminal to carry out steps comprising:
when the list of one or more identifiers is displayed on the touchscreen, in a case that a gesture of sliding left is detected, in response to the gesture of sliding left, displaying an identifier of a third software application (TSA) in the list and ceasing to display an identifier of a fourth software application (FSA) that was previously displayed in the list.

13. The non-transitory computer-readable storage medium according to claim 10, further comprising instructions that, when executed by the mobile terminal, cause the mobile terminal to carry out the following steps comprising:
when the list of one or more identifiers is displayed on the touchscreen, in a case that a gesture of sliding right is detected, in response to the gesture of sliding right, displaying an identifier of a fifth software application (FISA) in the list and ceasing to display an identifier of a sixth software application (SSA) that was previously displayed in the list.

14. The non-transitory computer-readable storage medium according to claim 10, wherein the one or more identifiers of software applications include one or more icons of software applications, and each icon is a same icon when each software application is represented as its corresponding icon on a home screen of the mobile terminal.

15. The non-transitory computer-readable storage medium according to claim 12, wherein the TSA is displayed in a separate window with an icon of the TSA displayed in the separate window.

16. The non-transitory computer-readable storage medium according to claim 13, wherein the FISA is displayed in a separate window with an icon of the FISA displayed in the separate window.

17. The non-transitory computer-readable storage medium according to claim 10, further comprising instructions that, when executed by the mobile terminal, cause the mobile terminal to carry out steps comprising:
when the list of software applications is displayed on the touchscreen, in a case that a gesture of closing a software application is detected, in response to the gesture of closing a software application, ceasing to display a seventh software application (SESA) in the list of software applications.

18. A method performed by a terminal, wherein the terminal comprises a touchscreen, the method comprising:
displaying a first software application in full on the touchscreen;
detecting a first sliding gesture;
determining whether the first sliding gesture is a first preset sliding up gesture starting from a position in a preset operating area of the touchscreen;
when the first sliding gesture is the first preset sliding up gesture, in response to the first sliding gesture, displaying a list of one or more identifiers of software applications recently active on the terminal;
when the list of the one or more identifiers is displayed on the touchscreen, in a case that a tap gesture is detected on an identifier of a second software application in the list, in response to the tap gesture, displaying the second software application in full on the touchscreen;
when the list of the one or more identifiers is displayed on the touchscreen, in a case that a second sliding gesture is detected, determining whether the second sliding gesture is a second preset sliding gesture starting from the preset operating area of the touchscreen, wherein the second preset sliding gesture is different from the first preset sliding gesture; and
when the second sliding gesture is the second preset sliding gesture, in response to the second sliding gesture, ceasing to display the list on the touchscreen;
wherein the preset operating area is a bottom area of the touchscreen.

19. The method according to claim 18, further comprising:
when the list of one or more identifiers is displayed on the touchscreen, in a case that a gesture of sliding left is detected, in response to the gesture of sliding left, displaying an identifier of a third software application in the list and ceasing to display an identifier of a fourth software application that was previously displayed in the list.

20. The method according to claim 18, further comprising:
 when the list of one or more identifiers is displayed on the touchscreen, in a case that a gesture of sliding right is detected, in response to the gesture of sliding right, displaying an identifier of a fifth software application in the list and ceasing to display an identifier of a seventh software application that was previously displayed in the list.

\* \* \* \* \*

UNITED STATES PATENT AND TRADEMARK OFFICE
CERTIFICATE OF CORRECTION

| | |
|---|---|
| PATENT NO. | : 11,029,839 B2 |
| APPLICATION NO. | : 15/109779 |
| DATED | : June 8, 2021 |
| INVENTOR(S) | : Hu et al. |

It is certified that error appears in the above-identified patent and that said Letters Patent is hereby corrected as shown below:

In the Claims

Claim 13: Column 15, Line 64: "mobile terminal to carry out the following steps comprising:" should read -- mobile terminal to carry out steps comprising: --.

Signed and Sealed this
Second Day of August, 2022

Katherine Kelly Vidal
*Director of the United States Patent and Trademark Office*